(12) United States Patent
Wang et al.

(10) Patent No.: US 11,307,082 B2
(45) Date of Patent: Apr. 19, 2022

(54) METHOD FOR MONITORING MOTOR VIBRATION, TERMINAL DEVICE, AND COMPUTER READABLE STORAGE MEDIUM

(71) Applicant: AAC Technologies Pte. Ltd., Singapore (SG)

(72) Inventors: Xiuyue Wang, Shenzhen (CN); Yulei Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 284 days.

(21) Appl. No.: 16/524,161

(22) Filed: Jul. 28, 2019

(65) Prior Publication Data

US 2020/0041333 A1 Feb. 6, 2020

(30) Foreign Application Priority Data

Aug. 1, 2018 (CN) .......................... 201810867149.8

(51) Int. Cl.
*G01P 1/12* (2006.01)
*G01P 1/07* (2006.01)
*G01H 1/12* (2006.01)

(52) U.S. Cl.
CPC .................. *G01H 1/12* (2013.01); *G01P 1/07* (2013.01); *G01P 1/12* (2013.01)

(58) Field of Classification Search
CPC .............. G01H 1/12; G01P 1/12; G01P 1/07
USPC .......................................................... 73/584
See application file for complete search history.

(56) References Cited

U.S. PATENT DOCUMENTS

| | | | | |
|---|---|---|---|---|
| 5,995,910 | A * | 11/1999 | Discenzo | G01M 13/045 702/34 |
| 6,289,735 | B1 * | 9/2001 | Dister | G01H 1/003 73/579 |
| 6,308,787 | B1 * | 10/2001 | Alft | E21B 7/265 175/48 |
| 9,595,179 | B2 * | 3/2017 | Cloutier | G08B 21/182 |
| 11,067,496 | B2 * | 7/2021 | Dubois | G01N 19/08 |
| 2015/0185934 | A1 * | 7/2015 | Leng | G06F 3/0488 345/173 |
| 2017/0212085 | A1 * | 7/2017 | Kajita | G01N 29/46 |

(Continued)

FOREIGN PATENT DOCUMENTS

| | | | | |
|---|---|---|---|---|
| CN | 201417174 | * | 3/2010 | ............ G01H 17/00 |
| CN | 104615036 A | * | 5/2015 | ........... G05B 19/042 |

(Continued)

OTHER PUBLICATIONS

1st Office Action dated Jul. 21, 2020 by SIPO in related Chinese Patent Application No. 201810867149.8 (7 Pages).

*Primary Examiner* — Jacques M Saint Surin
(74) *Attorney, Agent, or Firm* — W&G Law Group

(57) ABSTRACT

Embodiments of the present disclosure relate to the field of intelligent devices. The present disclosure provides a method for monitoring motor vibration, a terminal device, and a computer readable storage medium. In the method, vibration data of the motor is acquired in real time when it is detected that a motor is vibrating; the vibration data is converted into image data indicating a vibration sensation; and the image data is displayed. In this way, the strength of motor vibration is visualized, and the distinguishability of tactile perception is improved.

11 Claims, 3 Drawing Sheets

(56) References Cited

U.S. PATENT DOCUMENTS

2017/0219421 A1* 8/2017 Takahashi .......... G01N 29/4454
2017/0227505 A1* 8/2017 Araki .................... G01N 29/14

FOREIGN PATENT DOCUMENTS

CN    105258926       *  1/2016  ............ G01M 13/00
CN    107290040  A1     10/2017

* cited by examiner

METHOD FOR MONITORING MOTOR VIBRATION, TERMINAL DEVICE, AND COMPUTER READABLE STORAGE MEDIUM

TECHNICAL FIELD

The present disclosure relates to the field of intelligent devices, and in particular, to a method for monitoring motor vibration, a terminal device, and a computer readable storage medium.

BACKGROUND

Motors provide tactile experience to users, and good vibration feedback can bring different product experience to users. Currently, motors on the market have been widely applied to products, and mostly can meet the requirements of users. Use of a motor in a terminal device to enhance user experience has been a widely used technical means.

The inventor finds that the existing technology has at least the following problem: In the prior art, although a user can determine the strength of motor vibration through tactile perception, the tactile perception is not distinguishable enough, and therefore the user cannot accurately determine the strength of motor vibration.

DETAILED DESCRIPTION

To make the objectives, technical solutions, and advantages of the embodiments of the present disclosure clearer, the following further describes embodiments of the present disclosure in detail with reference to the accompanying drawings. However, those of ordinary skill in the art may understand that, in the various embodiments of the present disclosure, numerous technical details are set forth to provide the reader with a better understanding of the present disclosure. However, the technical solutions claimed in the present disclosure can further be implemented without these technical details and various changes and modifications based on the following embodiments.

A first embodiment of the present disclosure relates to a method for monitoring motor vibration. The core of this embodiment is: acquiring, in real time, vibration data of the motor during vibration when detecting that a motor is vibrating; converting the vibration data into image data indicating a vibration sensation; displaying the image data. In this way, the strength of motor vibration is visualized, and the distinguishability of tactile perception is improved. Implementation details of the method for monitoring motor vibration according to this embodiment will be specifically described below. The following content is merely implementation details provided for convenience of understanding, and is not necessary for implementing this solution.

Figure 1:
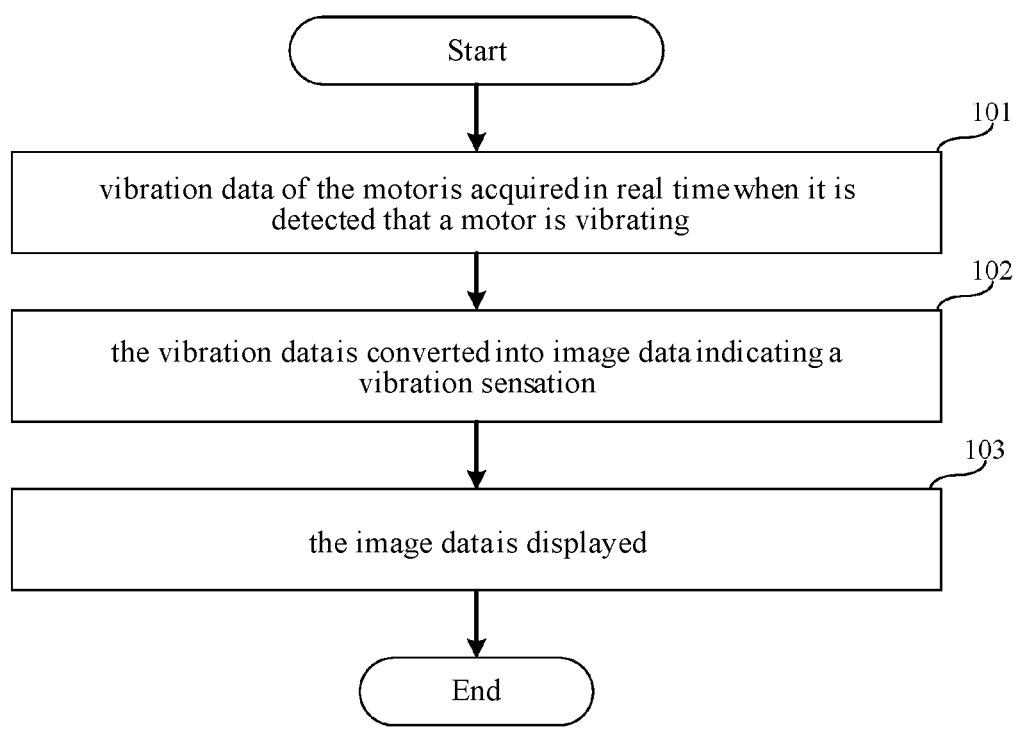
FIG. 1 is a flowchart of a method for monitoring motor vibration according to a first embodiment of the present disclosure.

As shown in FIG. 1, the method for monitoring motor vibration in this embodiment specifically includes the following steps:

Step 101, when it is detected that a motor is vibrating, vibration data of the motor is acquired in real time.

Specifically, a terminal device monitors the motor to determine whether the motor vibrates, and acquires, in real time, vibration data of the motor during vibration when it is detected that the motor is vibrating. The vibration data may be a vibration amount of the motor, and the vibration strength of the motor may be determined according to the vibration amount of the motor. When the terminal device includes a plurality of motors, the step of acquiring, in real time, vibration data of the motor during vibration may be separately acquiring, in real time, vibration data of the plurality of motors during vibration. Each of the vibration data corresponds to the motor from which the vibration data is acquired, to prevent improper data processing that occurs when the vibration data acquired from the motors cannot be distinguished from each other.

Step 102, the vibration data is converted into image data indicating vibration sensation.

Specifically, the vibration data may be converted into the image data indicating the vibration sensation. Because motor vibration is a process of producing a vibration sensation, and the user is not sensitive to the strength of the vibration sensation, converting the vibration data into an image is a good choice to visually inform the user of the vibration sensation. To obtain the image data indicating the vibration sensation, the vibration sensation needs to be associated with an image first. That is, a correspondence relationship between vibration data of the motor during vibration and an image needs to be preset. In other words, an image corresponding to the vibration data may be acquired according to the vibration data of the motor during vibration and the preset correspondence relationship. The correspondence relationship is a correspondence relationship between the vibration data and the image.

For example, the acquired vibration data is vibration velocity, and the acquired vibration velocity is of 10 mm/s, where every 1 mm/s corresponds to a stripe pattern of one unit length. For the vibration velocity of 10 mm/s, a stripe pattern of 10 unit lengths may be obtained as a pattern indicating the vibration sensation.

For another example, the acquired vibration data is vibration acceleration, and a correspondence relationship between the vibration acceleration of the motor during vibration and an image is preset. In this way, when the acquired vibration acceleration is 1 mm/(s^2), a pattern indicating the vibration acceleration of 1 mm/(s^2) may be obtained according to the correspondence relationship between the vibration acceleration and the image.

Step 103, the image data is displayed.

Specifically, after the image data indicating the vibration sensation is acquired, the acquired image data is displayed on a display screen to visually inform the user of the vibration sensation. In this way, the strength of motor vibration is visualized, and the distinguishability of tactile perception is improved. As the step of acquiring the vibration data is continuously performed as time goes by, the step of obtaining the image data is also continuously performed as time goes by. Accordingly, the image data may be displayed on the display screen in various manners. Some method for displaying the image data on the display screen are described below as examples.

The step of displaying the image data may be displaying a currently acquired image after a previously acquired image according to a chronological order in which the images are acquired. That is, when the display screen includes an image display area using time as abscissa, images indicating vibration sensation continuously appear on the display area. Each time a new image indicating a vibration sensation appears, the new image will be displayed after a previously acquired image. If the image indicating the vibration sensation is a bar chart, a plurality of bar charts abutting with each other constitute the image display area indicating the vibration sensation.

The step of displaying the image data may alternatively be deleting a displayed image corresponding to previously acquired vibration data. That is, only the image corresponding to the currently acquired vibration data is displayed on the display screen, and the image corresponding to the previously acquired vibration data is deleted, enabling the user to more intuitively perceive the current vibration sensation of the motor.

When there are a plurality of motors, the method for displaying the image data may be independently and simultaneously displaying images corresponding to the vibration data of the plurality of motors. That is, an independent image display area indicating the vibration sensation is set for each motor. The step of independently displaying images corresponding to the vibration data of the plurality of motors may specifically be: determining a display position of each motor according to a built-in position of each of the plurality of motors, where the display position of each motor corresponds to the built-in position of each of the plurality of motors respectively; and independently displaying the image corresponding to the vibration data of each motor at the display position of each of the plurality of motors respectively. That is, if a motor is at the left part of the terminal device, and another motor is at the right part of the terminal device, an independent display area for an image corresponding to vibration data of the motor on the left part is located at the left part of the screen of the terminal device, which is consistent with that the motor locates at the left part of the terminal device; and similarly, an independent display area for vibration data of the motor at the right part is located at the right part of the screen of the terminal device. In this way, the user can more intuitively perceive that the image displayed on the screen corresponding to the vibration data shall correspond to which motor, and therefore can more intuitively perceive the vibration sensation of the motor. When the images corresponding to the vibration data of the plurality of motors are displayed independently and simultaneously, identification numbers of the plurality of motors may be marked on the independent display areas of the images corresponding to the vibration data. The identification number of the motor is used to enable the user to learn of the correspondence between the motor and the image corresponding to the vibration data displayed on the independent display area, so that the user can more intuitively perceive the vibration sensation of the motor.

In practical applications, a built-in sensor may be used to detect vibration of the motor, and send vibration data of the motor that is detected in real time to a processor. The vibration data may be a vibration amount of the motor, and the vibration strength of the motor may be determined according to the vibration amount of the motor. When the terminal device includes a plurality of motors built therein, the step of acquiring vibration data of the motor during vibration in real time may be separately acquiring, in real time, vibration data of the plurality of motors during vibration. each of the vibration data corresponds to the motor from which the vibration data is acquired, to prevent improper data processing that occurs when the vibration data acquired from the motors cannot be distinguished from each other.

Compared with the existing technology, in this embodiment, when it is detected that a motor is vibrating, vibration data of the motor during vibration is acquired in real time; the vibration data is converted into image data indicating a vibration sensation; and the image data is displayed. In this way, the strength of motor vibration is visualized, and the distinguishability of tactile perception to the user is improved.

Figure 2:
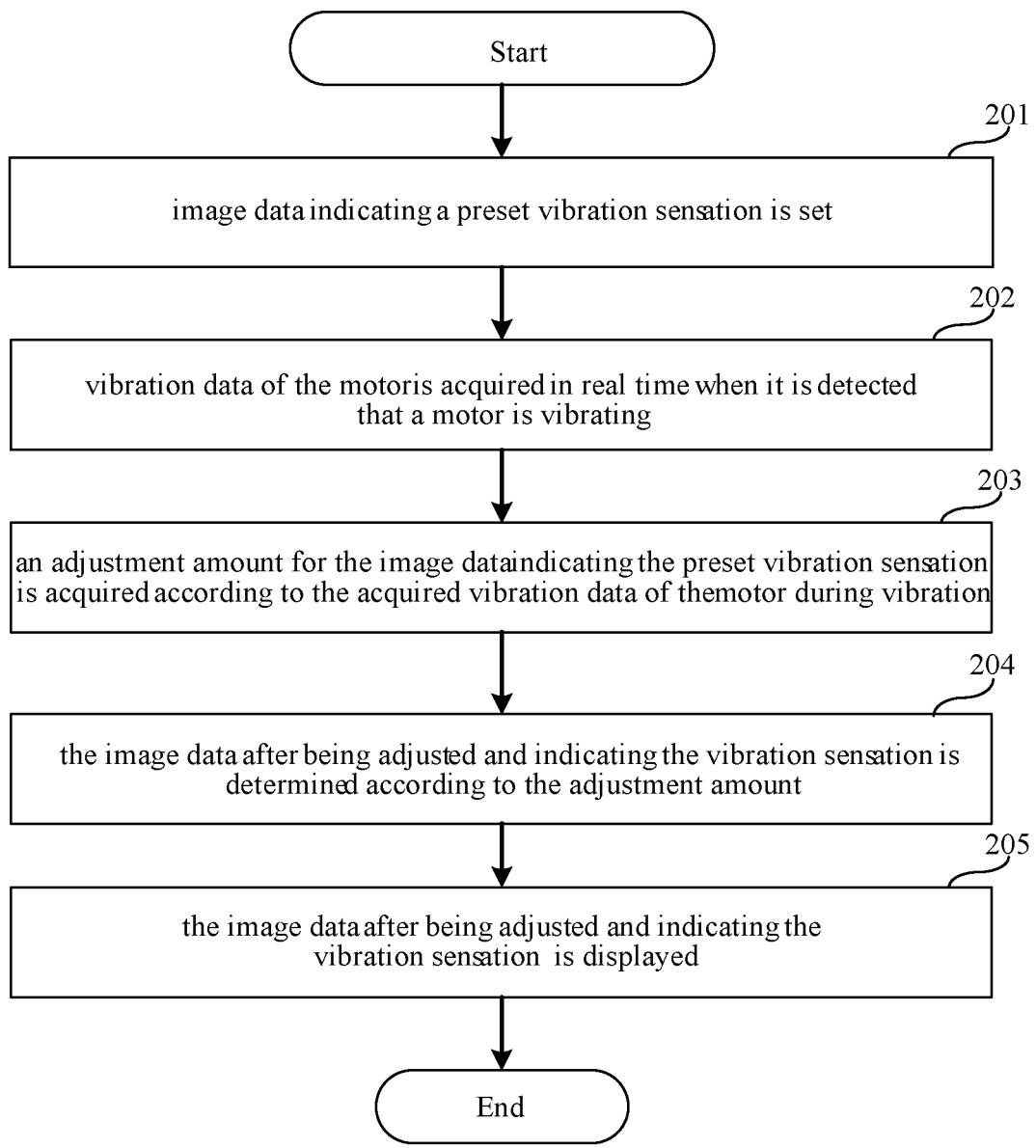
FIG. 2 is a flowchart of a method for monitoring motor vibration according to a second embodiment of the present disclosure.

A second embodiment of the present disclosure relates to a method for monitoring motor vibration. This embodiment is an improvement on the first embodiment. The improvement lies in that in this embodiment, the method further includes: setting image data indicating a preset vibration sensation before vibration data of the motor during vibration is acquired in real time, where the step of converting the vibration data into image data indicating a vibration sensation includes: acquiring, according to the acquired vibration data of the motor during vibration, an adjustment amount for the image data indicating the preset vibration sensation; and determining, according to the adjustment amount, the image data after being adjusted and indicating the vibration sensation; and the step of displaying the image includes: displaying the image data after being adjusted and indicating the vibration sensation. As shown in FIG. 2, the method for monitoring motor vibration in this embodiment includes the following steps.

Step 201, image data indicating a preset vibration sensation is set.

Specifically, image data corresponding to a present vibration sensation is preset for the motor. For example, the image may be a stripe pattern in which every 1 mm/s corresponds to one unit length. When the preset vibration sensation is vibration velocity of 10 mm/s, a stripe pattern of 10 unit lengths may be obtained as a pattern indicating the preset vibration sensation.

Step 202, when it is detected that a motor is vibrating, vibration data of the motor is acquired in real time. Since step 202 in this embodiment is basically the same as step 101 in the first embodiment, the details are not described in detail again.

Step 203, an adjustment amount for the image data indicating the preset vibration sensation is acquired according to the acquired vibration data of the motor during vibration.

Specifically, because the preset vibration sensation is set, the image data indicating the vibration sensation of the motor needs to be adjusted when the vibration data of the motor during vibration is acquired, so as to acquire the image data indicating the current vibration sensation. Therefore, the image data indicating the preset vibration sensation needs to be adjusted, and the adjustment amount needs to be acquired for the image data indicating the preset vibration sensation according to the acquired vibration data of the motor during vibration, so as to facilitate the adjustment of the image data. For example, a stripe pattern in which every 1 mm/s corresponds to one unit length is used as the image data indicating the vibration sensation, the preset vibration sensation is vibration velocity of 10 mm/s, and a stripe pattern of 10 unit lengths is obtained as a pattern indicating the preset vibration sensation. When the acquired vibration data of the motor during vibration is vibration velocity of 7 mm/s, the stripe pattern of 10 unit lengths needs to be adjusted. Because the difference between the vibration velocities is 3 mm/s, the adjustment amount for the image is 3 length units.

Step 204, image data after being adjusted and indicating a vibration sensation is determined according to the adjustment amount. That is, after the adjustment amount is acquired for the image data indicating the preset vibration sensation, the image data is adjusted, so that the image data after being adjusted can represent the vibration data of the motor during vibration.

Step 205, the image data after being adjusted and indicating the vibration sensation is displayed. Since step 205 in this embodiment is basically similar to step 103 in the first embodiment, the details are not described in detail again.

Compared with the existing technology, in this embodiment, image data indicating a preset vibration sensation is acquired; vibration data of the motor during vibration is acquired in real time when it is detected that a motor is vibrating; an adjustment amount is acquired for the image data indicating the preset vibration sensation according to the acquired vibration data of the motor during vibration; image data after being adjusted and indicating the vibration sensation is determined according to the adjustment amount; and the image data after being adjusted and indicating the vibration sensation is displayed. In this way, the image data indicating the vibration sensation can be more easily acquired, the strength of motor vibration is visualized, and the distinguishability of tactile perception is improved.

The foregoing division of the method into steps is merely for the purpose of description. During implementation, several steps may be combined into one step or one step may be decomposed into a plurality of steps, as long as the same logical relationship is included, and such combination and decomposition shall fall within the protection scope of the present disclosure. Any insignificant modification or design introduced to the algorithm or process without changing the core design of the algorithm and process shall fall within the protection scope of the present disclosure.

Figure 3:
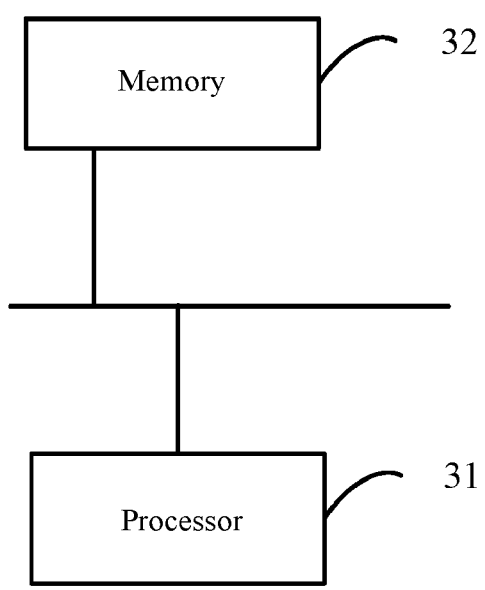
FIG. 3 is a schematic structural diagram of a terminal device according to a third embodiment of the present disclosure.

A third embodiment of the present disclosure relates to a terminal device. As shown in FIG. 3, the terminal device includes at least one processor 31 and a memory 32 communicably connected with the at least one processor 31. The memory stores instructions executable by the at least one processor 31. Execution of the instructions by the at least one processor 31 causes the at least one processor 31 to perform the method for monitoring motor vibration according to the first embodiment or the second embodiment of the present disclosure.

The memory 32 and the processor 31 are connected via a bus. The bus may include any quantity of interconnected buses and bridges. The bus connects various circuits of the one or more processors 31 and the memory 32. The bus may also connect various other circuits such as a peripheral device, a voltage regulator, and a power management circuit. These are known in the art, and the details are not described herein. A bus interface provides an interface between the bus and a transceiver. The transceiver may be one element or a plurality of elements such as a plurality of receivers and transmitters, and serves as a unit configured to communicate with various other devices over a transmission medium. Data processed by the processor 31 is transmitted over a wireless medium by using an antenna. The antenna further receives data and transmits the data to the processor 31.

The processor 31 is responsible for managing the bus and general processing, and may further provide various functions including timing, peripheral interface, voltage adjustment, power supply management, and other control functions. The memory 32 may be configured to store data used by the processor 31 executing an operation.

A fourth embodiment of the present disclosure relates to a computer-readable storage medium storing a computer program. The foregoing method embodiment is implemented when the computer program is executed by a processor.

It should be noted that the modules mentioned in this embodiment are all logical modules. In practical applications, a logical unit may be a physical unit or a part of a physical unit, or may be implemented as a combination of a plurality of physical units. In addition, to highlight the innovative part of the present disclosure, units which are not closely related to the technical problems to be solved in the present disclosure are not introduced in this embodiment, but the existence of other units in this embodiment is not excluded.

Those skilled in the art may understand that all or some of the steps in the methods according to the foregoing embodiments may be implemented by a program instructing relevant hardware. The program is stored in a storage medium and includes instructions used to enable a device (which may be a single-chip microcomputer, a chip, or the like) or a processor to implement all or some of the steps in the methods according to the foregoing embodiments of the present disclosure. The storage medium includes any medium that can store program code, such as a USB flash memory drive, a removable hard disk, a read-only memory (ROM), a random access memory (RAM), a magnetic disk, or an optical disc.

Those of ordinary skill in the art may understand that, the embodiments described above are specific embodiments for implementing the present disclosure, and in actual applications, various changes of the forms and details may be made without departing from the spirit and scope of the present disclosure.

What is claimed is:

1. A method for monitoring motor vibration, comprising:
   acquiring, in real time, vibration data of the motor when it is detected that a motor is vibrating;
   converting the vibration data into image data indicating vibration sensation; and
   displaying the image data,
   the method further comprises:
   setting image data indicating a preset vibration sensation before acquiring, in real time, vibration data of the motor during vibration, wherein
   the step of converting the vibration data into image data indicating a vibration sensation comprises:
   acquiring, according to the acquired vibration data of the motor during the vibration, an adjustment amount for the image data indicating the preset vibration sensation; and
   determining, according to the adjustment amount, the image data after being adjusted and indicating the vibration sensation; and
   the step of displaying the image data comprises:
   displaying the image data after being adjusted and indicating the vibration sensation.

2. The method for monitoring motor vibration according to claim 1, wherein the step of converting the vibration data into image data indicating vibration sensation comprises:
   acquiring the image data corresponding to the vibration data according to the vibration data of the motor during vibration and a preset correspondence relationship, wherein the correspondence relationship is a correspondence relationship between the vibration data and the image data.

3. The method for monitoring motor vibration according to claim 1, wherein the step of displaying the image data comprises:
  displaying currently acquired image data after previously acquired image data according to a chronological order in which the image data is acquired.

4. The method for monitoring motor vibration according to claim 1, wherein the step of displaying the image data further comprises:
  deleting displayed image data corresponding to previously acquired vibration data.

5. The method for monitoring motor vibration according to claim 1, wherein there are a plurality of motors;
  the step of acquiring, in real time, vibration data of the motor during vibration comprises: separately acquiring, in real time, vibration data of the plurality of motors during vibration; and
  the step of displaying the image data comprises: independently and simultaneously displaying image data corresponding to the vibration data of the plurality of motors.

6. The method for monitoring motor vibration according to claim 5, wherein the step of independently and simultaneously displaying image data corresponding to the vibration data of the plurality of motors comprises:
  determining a display position of each motor according to a built-in position of each motor, wherein the display position of each motor corresponds to the built-in position of each motor respectively; and
  independently displaying the image data corresponding to the vibration data of each motor at the display position of each motor respectively.

7. A non-transitory computer readable storage medium, storing a computer program, wherein the computer program includes instructions;
  the instructions, when executed by a processor, cause the processor to perform a method for monitoring motor vibration;
  wherein the method comprises:
  acquiring, in real time, vibration data of the motor when it is detected that a motor is vibrating;
  converting the vibration data into image data indicating vibration sensation; and
  displaying the image data,
  the method further comprises:

setting image data indicating a preset vibration sensation before acquiring, in real time, vibration data of the motor during vibration, wherein
the step of converting the vibration data into image data indicating a vibration sensation comprises:
acquiring, according to the acquired vibration data of the motor during the vibration, an adjustment amount for the image data indicating the preset vibration sensation; and
determining, according to the adjustment amount, the image data after being adjusted and indicating the vibration sensation; and
the step of displaying the image data comprises:
displaying the image data after being adjusted and indicating the vibration sensation.

8. The non-transitory computer readable storage medium according to claim 7, wherein the processor is caused to perform the step of converting the vibration data into image data indicating vibration sensation comprising:
  acquiring the image data corresponding to the vibration data according to the vibration data of the motor during vibration and a preset correspondence relationship, wherein the correspondence relationship is a correspondence relationship between the vibration data and the image data.

9. The non-transitory computer readable storage medium according to claim 7, wherein the processor is caused to perform the step of displaying the image data comprising:
  displaying currently acquired image data after previously acquired image data according to a chronological order in which the image data is acquired.

10. The non-transitory computer readable storage medium according to claim 7, wherein the processor is caused to perform the step of displaying the image data further comprising:
  deleting displayed image data corresponding to previously acquired vibration data.

11. The non-transitory computer readable storage medium according to claim 7, wherein there are a plurality of motors;
  wherein the processor is caused to perform the step of acquiring, in real time, vibration data of the motor during vibration comprises: separately acquiring, in real time, vibration data of the plurality of motors during vibration; and
  the step of displaying the image data comprises: independently and simultaneously displaying image data corresponding to the vibration data of the plurality of motors.

* * * * *